(12) United States Patent
Hoegele (10) Patent No.: US 11,948,293 B2
(45) Date of Patent: Apr. 2, 2024

(54) METHOD AND ARRANGEMENT FOR DETERMINING A POSITION OF AN OBJECT

(71) Applicant: Carl Zeiss Industrielle Messtechnik GmbH, Oberkochen (DE)

(72) Inventor: Wolfgang Hoegele, Rosenheim (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 175 days.

(21) Appl. No.: 17/163,543

(22) Filed: Jan. 31, 2021

(65) Prior Publication Data
US 2021/0241437 A1    Aug. 5, 2021

(30) Foreign Application Priority Data

Jan. 31, 2020 (DE) ...................... 10 2020 201 196.6
Dec. 15, 2020 (DE) ...................... 10 2020 215 960.2

(51) Int. Cl.
G06T 7/00      (2017.01)
G01N 21/88     (2006.01)
G06T 7/11      (2017.01)

(52) U.S. Cl.
CPC ......... G06T 7/001 (2013.01); G01N 21/8806 (2013.01); G06T 7/11 (2017.01);
(Continued)

(58) Field of Classification Search
CPC ... G06T 7/001; G06T 7/11; G06T 2207/1004; G01N 21/8806; G01N 2021/8845
(Continued)

(56) References Cited

U.S. PATENT DOCUMENTS 7,602,997 B2   10/2009   Young
7,856,154 B2   12/2010   Young
(Continued)

FOREIGN PATENT DOCUMENTS

CN   113424194 A   *   9/2021   ......... G06K 9/00664
CN   111527737 B   *   3/2022   ............. G02B 15/10
(Continued)

OTHER PUBLICATIONS

Handbook of Digital Signal Processing: Engineering Applications (Year: 1987).*
(Continued)

*Primary Examiner* — Matthew C Bella
*Assistant Examiner* — Pardis Sohraby
(74) *Attorney, Agent, or Firm* — Ewers IP Law PLLC; Falk Ewers (57) ABSTRACT

A position of an object is determined by optically capturing at least one capture structure arranged at the object or at a reference object captured from the object and thereby obtaining capture information, the at least one capture structure having a point-symmetrical profile of an optical property that varies along a surface of the capture structure, transforming a location-dependent mathematical function corresponding to the point-symmetrical profile of the optical property into a frequency domain, forming a second frequency-dependent mathematical function from a first frequency-dependent mathematical function, wherein the second mathematical function is formed from a relationship of in each case a real part and an imaginary part of complex function values of the first frequency-dependent mathematical function, and forming at least one function value of the second frequency-dependent mathematical function and determining the same as location information about a loca- (Continued)

tion of a point of symmetry of the location-dependent mathematical function.

14 Claims, 4 Drawing Sheets

(52) U.S. Cl.
CPC ........... *G01N 2021/8845* (2013.01); *G06T 2207/10004* (2013.01)

(58) Field of Classification Search
USPC .......................................... 382/141
See application file for complete search history.

(56) References Cited

U.S. PATENT DOCUMENTS

| | | | |
|---|---|---|---|
| 8,577,184 B2 | 11/2013 | Young | |
| 8,666,196 B2 | 3/2014 | Young | |
| 9,060,222 B2* | 6/2015 | Feistel | H04R 3/04 |
| 10,706,562 B2 | 7/2020 | Haverkamp et al. | |
| 10,748,300 B2 | 8/2020 | Haverkamp | |
| 10,957,074 B2* | 3/2021 | Deng | G06T 7/292 |
| 11,560,292 B2* | 1/2023 | Kosaka | G06T 7/187 |
| 2012/0267802 A1 | 10/2012 | De Boer et al. | |
| 2014/0270357 A1* | 9/2014 | Hampiholi | G06T 7/13 382/103 |
| 2017/0276468 A1 | 9/2017 | Ruck et al. | |
| 2017/0330350 A1* | 11/2017 | Ulichney | G06T 7/97 |
| 2017/0370690 A1 | 12/2017 | Held et al. | |
| 2018/0018778 A1* | 1/2018 | Haverkamp | G01B 21/042 |
| 2018/0106586 A1 | 4/2018 | Gruber et al. | |
| 2019/0362519 A1* | 11/2019 | Haverkamp | G06T 7/73 |
| 2019/0391372 A1 | 12/2019 | Haverkamp et al. | |
| 2020/0114519 A1 | 4/2020 | Horn et al. | |
| 2021/0293584 A1 | 9/2021 | Ele et al. | |
| 2022/0007216 A1 | 1/2022 | Asada et al. | |

FOREIGN PATENT DOCUMENTS

| | | | | |
|---|---|---|---|---|
| CN | 114467111 A | * | 5/2022 | ............ G06T 7/70 |
| DE | 102006060716 A1 | | 6/2008 | |
| DE | 102015205738 A1 | | 10/2016 | |
| DE | 102018203786 A1 | * | 9/2019 | ........... A61B 5/0515 |
| DE | 102018208203 A1 | | 11/2019 | |
| JP | 2013038563 A | * | 2/2013 | ............ G06T 5/003 |
| WO | WO-2014084706 A1 | * | 6/2014 | ............ H04S 5/00 |

OTHER PUBLICATIONS

STAR-HSPICE, Performing FFT Spectrum Analysis, (1998).
Software filtering: Windowing General Analog Concepts, http://www.ni.com/productdocumentation5357en/ (2016).
Young et al., Superresolution image reconstruction from a sequence of aliased imagery, Applied Optics, vol. 45, No. 21, Jul. 20, 2006.
Andraka, How to build ultra-fast floating point FFTs in FPGAs, https://www.eetimes.com/how-to-build-ultra-fastfloating-point-ffts-in-fpgas/?page_number=2 (2007).
Krapels et al., Characteristics of infrared imaging systems that benefit from superresolution reconstruction, Applied Optics, vol. 46, No. 21, Jul. 20, 2007.
Hu et al., Super-resolution for flash ladar imagery, Applied Optics, vol. 49, No. 5, Feb. 10, 2010.
Hu et al., Face recognition performance with superresolution, Applied Optics, vol. 51, No. 18, Jun. 20, 2012.
Uzun et al., FPGA Implementations of Fast Fourier Transforms for Real-Time Signal and Image Processing, School of Computer Science, (2003).
Kim et al., Phase-slope and group-dispersion calculations in the frequency domain by simple optical low-coherence reflectometry, Applied Optics, vol. 42, No. 34, Dec. 2003.
Berndt,Using Phase Slope for Arrival Time Determination, scEye Research & Development, Oakland, CA, USA; Johnson, G.C., Schniewind, A.P., University of California, Berkeley, CA, USA, 2006.
Office Action issued in German Patent Application No. DE 10 2020 201 196.6, dated Sep. 29, 2020 (to which this application claims priority) and English language translation thereof.
U.S. Appl. No. 17/163,545, filed Jan. 31, 2021, Nils Haverkamp, Carl Zeiss Industrielle Messtechnik GmbH.

* cited by examiner

METHOD AND ARRANGEMENT FOR DETERMINING A POSITION OF AN OBJECT

CROSS REFERENCE TO RELATED APPLICATIONS

This application claims priority to German patent applications DE 10 2020 201 196.6, filed Jan. 31, 2020, and DE 10 2020 215 960.2, filed on Dec. 15, 2020, the entire content of both applications is incorporated herein by reference.

TECHNICAL FIELD

The disclosure relates to a method and an arrangement for determining a position of an object, in particular of a component of an arrangement of components.

BACKGROUND

The object can be a stationary and/or movable object. In the case of a movable object, the position of the object can be determined repeatedly and a movement of the object can be tracked as a result. Particularly in the case of a stationary object that is part of an arrangement of objects and in particular of components, the position not just of one object but rather of a plurality of objects of the arrangement can be determined for example in a coordinate system that is stationary with regard to the arrangement.

The object can furthermore be part of an arrangement of objects and in particular components. The arrangement can be for example a complex arrangement having a plurality of components, e.g., a machine, a medical treatment apparatus (e.g., an apparatus for irradiating a patient and/or an apparatus for moving a treatment tool). Examples of a machine having at least one movable component are a coordinate measuring machine, a robot, a material applying machine (for example a 3D printer) or a machine tool. The arrangement of components and in particular the machine can include a drive device for driving a movement of at least one movable component. However, the disclosure also relates to arrangements of components having at least one movable component, the movement of which is also or exclusively manually driveable. In particular, the disclosure therefore makes it possible to determine a position and/or an orientation of a movable object of one of the abovementioned types of arrangements.

The arrangement for determining a position of an object has in particular a capture structure or an arrangement of capture structures (in particular a target, see below) and a capturing device for optically capturing the capture structure(s). The capture structure(s) can be connected to the object and the capturing device for optically capturing the capture structure(s) can be connected to a different object (in the case of a movable object, for example, to a reference object that is not concomitantly moved with the movable object), such that the position and optionally also the orientation of the object result or can be determined from the position of the capture structure or from the positions of the capture structures. Alternatively or additionally, it is possible for the capture structure or the capture structures not to be connected to the object and it is possible for the capturing device to be connected to the object. Combinations of these two principles are possible. For example, one capturing device of the capturing device can be connected to the object, wherein the capturing device captures at least one capture structure which is not connected to the object, and at least one capture structure which is captured by another capturing device of the capturing device can be connected to the object.

The position and/or orientation of the movable object can therefore be determined in particular relative to the reference object. In particular, it is possible to determine the position and/or orientation in relation to a stationary coordinate system or a coordinate system that is concomitantly moved with another component or the patient.

Capturing the position and/or the orientation of a movable part of a coordinate measuring machine on the basis of optically capturing capture structures is known, e.g., from DE 10 2015 205 738 A1.

SUMMARY

In an exemplary embodiment of the disclosure, the position of the object and/or the orientation thereof can be used to control the movement of the movable part by open-loop or closed-loop control.

The number of degrees of freedom of movement to be captured or the number of captured degrees of freedom of movement, and hence also the coordinate axes and/or axes of rotation, in relation to which the position and/or orientation is to be determined or is determined, can be of different magnitudes. By way of example, the position can be determined in relation to one, two or three linear axes of the movement or coordinate axes. Alternatively or additionally, the orientation can be determined in relation to one, two or three axes of rotation and/or as an orientation vector in a two-dimensional or three-dimensional coordinate system.

In one specific configuration, a plurality of capture structures form an arrangement of capture structures, wherein the plurality of capture structures are captured optically for the purpose of determining the position and/or orientation of the movable object. In this case, one or more of the capture structures can optionally be captured by the same capturing device (for example digital camera). An arrangement of capture structures connected to one another directly, i.e., not just via the movable object or the reference object, is also referred to as a marker or a target.

In this description, a capturing device is understood to mean a device which has at least one capturing unit. The capturing device can therefore have for example a single capturing unit such as a digital camera, for example. Alternatively, the capturing device can have an arrangement of capturing units (for example digital cameras). In this case, one or more capturing units can optionally be directly connected to one another. However, it is also possible for at least two capturing units to be connected to one another only indirectly for example via connecting elements between different objects of the arrangement of objects.

By way of example, the capturing unit or a plurality of capturing units can be part of a manually guided (and therefore movable) apparatus that captures capture information about the position and/or orientation of the object or of an arrangement of objects. The position and orientation of the manually guided apparatus in space can in turn be determined with a stationary device, e.g., a laser movement tracking device. When the manually guided apparatus is moved, this is established with the stationary device. The position and/or orientation of the object in space are/is therefore determined taking account of the information generated by the stationary device and taking account of the information generated by the manually guided apparatus. Alternatively, instead of the manually guided apparatus, an apparatus that is movable by machine can capture the capture information about the position and/or orientation of the object.

Optical capturing is understood to mean that electromagnetic radiation is captured. Areal capture structures, i.e., capture structures that extend along an area, in particular a surface, are already known per se. In the case of areal capture structures, structures extending transversely with respect to the area are not important for capturing and evaluating said capture structures. By way of example, such areal capture structures can be realized as two-dimensional grayscale value distributions or binary distributions. In particular, binary distributions have dark and bright regions, e.g., black and white regions. Examples include one-dimensional barcodes and two-dimensional matrix codes. Areal capture structures, in particular two-dimensional capture structures, can, e.g., be printed onto a surface (e.g., by inkjet printing), be etched into the surface and/or be introduced into the surface in some other way by partial material removal and/or be applied by material application. In other words, the surface can be structured in such a way that an areal capture structure arises. During introduction and/or application, e.g., a continuous layer having different optical properties can be produced and/or material can be removed and/or applied only in partial regions of the surface.

Furthermore, for producing the capture structure, alternatively or additionally, an arrangement of sources of electromagnetic radiation (for example a display) can be used, with which the capture structure is represented during capturing. What is suitable is, in particular, a one- or two-dimensional matrix of lighting elements such as, for example, a display or an arrangement of displays including organic light emitting diodes (OLEDs). It is also possible to project an image onto a surface of a marker, wherein the structure projected onto the surface of the marker forms the capture structure by itself or together with permanent optical properties of the marker. The projected structure is referred to as non-permanent since the projection can be started and ended.

The capture structures can be optimized for their respective application. By way of example, they can contain an encoding and/or be combined with an encoding in order to make them distinguishable from other capture structures. The capture structures and optionally the markers should also be optimized for determining the position and/or orientation of the movable component and for specific applications such as determining the speed of movement.

The disclosure includes, in particular, tracking the movement of a movable object with regard to a number of local degrees of freedom of the movement. Tracking the movement includes, in particular, repeatedly capturing the capture structure or a plurality of the capture structures, such that the position, the speed (in particular only the absolute value thereof or alternatively also the direction thereof), the acceleration (in particular only the absolute value thereof or alternatively also the direction thereof) and/or the orientation of the movable part is/are ascertainable in each case from the result of an instance of capturing, optionally taking account of the capturing results obtained for an earlier state of movement and/or later state of movement. The capturing can include, not just for the purpose of tracking movement, in particular the recording of one or more images of at least one capture structure, e.g., with one or more digital cameras.

Expressed in a general way, evaluating the capture information, i.e., the information which is/was obtained during a capturing process, makes it possible to determine a state of movement, in particular the instantaneous position, instantaneous orientation, instantaneous speed and/or instantaneous acceleration, in relation to a number of spatial degrees of freedom of the movement of the movable part.

The movable object can be a tool, e.g., a tactile probe or sensor, a non-tactile, in particular optical, sensor for determining coordinates of a workpiece, a processing tool (e.g., a mechanical, optical, chemical, or other processing tool) for processing a workpiece, or a tool for adding material to a workpiece. Independently of the specific application, the aim is often to determine from the capturing firstly the position and/or orientation of the capture structure(s) and thus indirectly the position and/or orientation of the movable part (e.g., of the tool). In particular, it is also possible to determine the speed by integrating the determined acceleration over time and/or to determine the position of the object by integrating the speed over time.

In the case of capturing the capture structure(s) with at least one image, in particular a digital image, it is possible to have recourse to image processing methods known per se when evaluating the capture information. Generally, determining the position and/or orientation of the object (e.g., tool) that is actually to be observed requires being able to uniquely identify the object or an object connected thereto (for example a connected article) or a combination of both. The identification must therefore be reliable, and it is advantageous in most cases if it is carried out rapidly. If the intention is to observe a plurality of objects simultaneously and in particular to track the movements thereof, the articles must also be uniquely identifiable, or at least distinguishable from one another.

It is known to use capture structures or markers which are combined with the actual object to be observed and are secured thereto, for example. The capture structures or markers can be configured such that they are able to be captured in a reliable, distinguishable and rapid manner. The distinguishability relates not only to different movable objects, but also to a single, or each individual, movable object that is intended to be distinguishable from its surroundings and its background. Suitably fashioned capture structures, arrangements of capture structures or markers can also ensure this.

Particularly when capturing the position of a plurality of components of an arrangement and when controlling movement processes which are based on the aforementioned movement tracking, i.e., which use the position and/or orientation determined from the capture information as a basis for the control, the capturing and also the evaluation of the capture information ought to be robust, i.e., the susceptibility to errors ought to be low. Errors may lead to erroneous measurement results, incorrectly processed workpieces, incorrectly produced workpieces and collisions of objects. In medical therapy, corresponding examination errors and treatment errors may occur in the case of capture errors. This holds true, e.g., if the examination or treatment is carried out at least in part by a robot.

The preceding and the following description also relate, in particular, to the disclosure and configurations thereof.

If the capture information is one- or two-dimensional information such as is the case for digital camera images, for example, then it is possible to refer to a viewing direction, in particular the optical axis of the camera, which extends perpendicularly to the one-dimensional line or to the two-dimensional area of the capture information. Capture structures whose orientation (which extends in particular perpendicularly to the course of the line or area) is not identical to the viewing direction can be regarded as rotated about an axis of rotation extending perpendicularly to the viewing direction.

The optical capturing of capture structures for the purpose of determining the position and/or orientation of an object is advantageously carried out with imaging methods, i.e., the capturing takes place in a spatially resolved manner at least in relation to one direction. By comparison with methods, including optical methods, which track an object merely in a punctiform manner, e.g., with lasers, the realization is simplified, and an object lost in the course of the movement tracking can be found again in a simpler manner. However, the volume of data is increased during the processing of image information. Conventional digital cameras that capture two-dimensional images have, e.g., 1024 or 2048 image lines and image columns, with the result that a corresponding plurality of pixels with volumes of data of the order of magnitude of megabytes have to be processed in order to determine the position and/or orientation of the movable object.

In order that at least the position of a movable object can be determined rapidly from image data of optical capturing and in particular temporally finely resolved movement tracking can therefore be achieved with repeated capturing and evaluation, as is the case for exemplary embodiments of the present disclosure, a method for determining the position and/or orientation of a movable object, a corresponding arrangement, a capture structure or arrangement of capture structures and/or a method for producing a capture structure or arrangement of capture structures are/is desirable which enable rapid capturing and evaluation of the captured information with regard to the position and/or orientation of the movable object. In particular, industrially suitable computers or computer systems ought to be able to determine the position and/or orientation of the movable object continuously with a repetition rate of the order of magnitude of 1 kHz, given a commercially available camera pixel number of 1024×1024 or 2048×2048.

Capture structures can be created with the elements of the structures having different sizes. With inkjet printing, it is possible to generate for example printed images whose image elements (so-called image points) have very small dimensions of the order of magnitude of 5 micrometers. In practice, however, light emitting diodes are also used for optical position determination, said diodes having a considerably larger local extent transversely with respect to the capturing direction. It is endeavored to enable a high accuracy of the position determination, which is suitable, in principle, for all types of embodiments of capture structures.

A solution and configurations thereof which enable at least one of these aims to be achieved are provided in the following description. In this case, the solution relates to a method and an arrangement for determining a position and/or orientation of a movable object, and a method for producing the arrangement.

It is proposed to use a capture structure for optical capturing, wherein the capture structure has specific features that allow the capture information obtained from capturing the capture structure to be evaluated precisely.

The capture structure has a profile of an optical property that varies along a surface of the capture structure. The optical property can be in particular an emittance, reflectance and/or absorptance with regard to the emission, reflection and/or absorption, respectively, of electromagnetic radiation in at least one wavelength range and/or for at least one discrete wavelength. In many cases, in particular when recording an image of the capture structure with a digital camera, the profile of the optical property is characterized by a local distribution of the radiation flux density of electromagnetic radiation in at least one wavelength range and/or for at least one wavelength of emitted and/or reflected electromagnetic radiation. The radiation flux density distribution is captured by the capturing device (for example by the sensor elements of the digital camera). In this case, a weighting of the local distribution received by the capturing device can take place on account of the spectral sensitivity of the sensor elements that is not constant over all wavelengths.

The profile of the optical property of the capture structure is point-symmetrical with respect to a point of the capture structure. A point-symmetrical profile and a corresponding point-symmetrical function are understood to mean that at places of the profile and of the function, respectively, which are located at equal distances and in opposite directions from the point of symmetry, the optical property has the same values, and the function values are equal in magnitude. As already mentioned, the capture structure can be one-dimensional or two-dimensional, i.e., can extend in one direction along the surface or in two directions running perpendicularly to one another along the surface. Surface directions extend transversely with respect to the direction in which the capture structure is captured by the capturing device. Otherwise, the profile of the optical property cannot be captured by the capturing device. The fact that the capture structure is one-dimensional or two-dimensional with regard to its extent along its surface does not exclude the capture structure also extending transversely with respect to its surface. Solely the appearance of the capture structure along the at least one direction along the surface is of importance, however, for the capturing in particular with a digital camera that records a one-dimensional or two-dimensional image of the capture structure.

In the case of a one-dimensional capture structure, the profile of the optical property is point-symmetrical with respect to a location or a place along the observed surface direction. In the case of a two-dimensional capture structure, the latter can be two-dimensionally point-symmetrical or else only one-dimensionally point-symmetrical. If the two-dimensional capture structure is only one-dimensionally point-symmetrical, then the implementation of the method according to the disclosure is not possible in any case with regard to at least one surface direction. It remains possible, however, with regard to at least one other surface direction.

The captured profile of the optical property can be expressed by a corresponding profile of numerical values. Particularly when the capture structure is captured with at least one digital camera, in each case at least one numerical value corresponding to the received quantity of radiation (radiation intensity integrated over an irradiation time interval) is obtained for the individual pixels of the recorded images of the capture structure. More than one numerical value that is in each case a measure of a wavelength range of the received quantity of radiation can optionally be obtained here for each pixel. In the case of color cameras it is customary to obtain three or four values per pixel, in which case the wavelength ranges can overlap. One of the wavelength ranges can also contain all the other wavelength ranges. In one configuration of the method, it is sufficient, however, if a single numerical value per pixel is used for the evaluation.

Optionally, the pixel numerical values generated by the camera can still be processed further before or during their evaluation. In particular, the numerical values can be weighted and/or scaled differently. For example, a normalization can be achieved by way of a scaling to the maximum value of one, which normalization may be advantageous for the evaluation.

In all these cases, after the capture structure has been captured, capture information is present in any case with regard to a surface direction of the capture structure, wherein the profile of the numerical values that corresponds to the surface direction is approximately symmetrical with respect to a point of the captured profile of the numerical values. Even in the case of an exactly point-symmetrical capture structure, which in practice is achievable only with high accuracy but not completely, asymmetrical portions of the profile arise during the capturing. One reason why this is so has to do with asymmetries of an imaging optical unit used, with which the electromagnetic radiation emanating from the capture structure is imaged onto the recording medium (such as a sensor matrix of a digital camera, for example).

In order to evaluate the capture information, the captured and optionally further processed profile of the numerical values which corresponds to a captured surface direction of the capture structure and which is referred to in this description as a one-dimensional mathematical function in the space domain or a one-dimensional location-dependent mathematical function is then transformed into a frequency domain. If a two-dimensional point-symmetrical capture structure was captured and is intended to be evaluated two-dimensionally, the two-dimensional profile of the numerical values which corresponds to a captured surface region of the capture structure and which is referred to in this description as a two-dimensional mathematical function in the space domain or a two-dimensional location-dependent mathematical function is transformed into a frequency domain.

The transformation of the location-dependent mathematical function from the space domain into the frequency domain is typically embodied as Fourier transformation, e.g., a discrete Fourier transformation (DFT), a fast Fourier transformation (FFT) or a Fourier transformation for discrete-time signals (DTFT—Discrete-Time Fourier Transformation). In the case of the DTFT, the latter is applied to the discrete-location profile analogously to the application—encountered more often in mathematics—in which discrete-time signals are transformed into the frequency domain. In the case of DTFT, a continuous frequency spectrum arises as a result of the transformation.

Fast algorithms are available in particular for these three types of discrete Fourier transformations, which algorithms can in particular also be executed with data processors configured specifically for this purpose. These and other discrete transformations into the frequency domain can therefore process capture information of the capture structure or of an arrangement of such capture structures, said capture information being generated by at least one digital camera. If the capture structure is located at a different position during and/or after the movement of the object, the respective position can be determined rapidly by way of the repeated capturing of the capture structure or of the arrangement of capture structures.

In general, the function transformed into the frequency domain, even in the case of a real function, as is the case for the location-dependent mathematical function, is a function of complex values, i.e., a function having real function values and a function having imaginary function values can be obtained. In particular, the phase of the complex values as a function of frequency here contains the information about the location or the position of the point of symmetry in the space domain. The phase of the complex values can also be regarded as the angle between the imaginary part and the real part of the complex numbers, which angle is present in a graphical representation of the respective number in a two-dimensional Cartesian coordinate system.

As will also be described in larger detail in the description of the figures, the information about the location of the point of symmetry in the space domain, in the case of a point-symmetrical function, can be determined accurately in particular by the first derivative of the function $\arg(X(\omega))$ being formed and the result multiplied by the factor minus one being output as the position of the location and thus the position of the capture structure. In this case, the function arg denotes the phase, X denotes the frequency-dependent mathematical function transformed into the frequency domain, and $\omega$ denotes the angular frequency, i.e., the frequency f multiplied by $2\pi$. In practice, however, it is typical not to form the function $\arg(X(\omega))$ explicitly, but rather, from the function transformed into the frequency domain, to form for example the aforementioned first derivative directly from corresponding intermediate results, wherein also at least one higher derivative can be concomitantly taken into account. If the point of symmetry lies at the location with the value zero, then the mathematical function transformed into the frequency domain is a real function, the function values of which therefore have no imaginary components. The phase thus has a constant value of zero and its first derivative is likewise zero, which in turn corresponds to the location having the value zero.

In the evaluation of digital capture information, as in the case of camera images from digital cameras, the unit of frequency f can be regarded as the reciprocal of the index of the pixels of the evaluated camera image. For example, in an image line or image column, the pixels present therein are designated in their order by the integral index running from zero to n−1 or from 1 to n, wherein n is the number of pixels in the image line or image column.

In particular, the following method for determining a position of an object, in particular a component of an arrangement of components is provided, wherein at least one capture structure arranged at the object or at a reference object is optically captured and capture information is obtained as a result, the at least one capture structure has a point-symmetrical profile of an optical property that varies along a surface of the capture structure, a location-dependent mathematical function corresponding to the point-symmetrical profile of the optical property that is captured with the capture information is transformed into a frequency domain, such that a first frequency-dependent mathematical function is obtained, a second frequency-dependent mathematical function is formed from the first frequency-dependent mathematical function, wherein the second mathematical function is formed from a relationship of in each case a real part and an imaginary part of complex function values of the first frequency-dependent mathematical function, at least one function value of the second frequency-dependent mathematical function is formed and determined as location information about a location of a point of symmetry of the location-dependent mathematical function.

The disclosure furthermore relates to an arrangement for determining a position of an object, in particular a component of an arrangement of components, wherein the arrangement has at least one capture structure which is arrangeable at the object or at a reference object captured from the object, and has a capturing device for capturing the capture structure, the capturing device is configured to optically capture the at least one capture structure and to obtain capture information as a result, the at least one capture structure has a point-symmetrical profile of an optical property that varies along a surface of the capture structure, the arrangement has an evaluation device, wherein the evaluation device and/or the capturing device are/is configured to generate a location-dependent mathematical function corresponding to the point-symmetrical profile of the optical property that is captured with the capture information, the evaluation device is configured to transform the location-dependent mathematical function into a frequency domain, such that a first frequency-dependent mathematical function is obtained, the evaluation device is configured to form a second frequency-dependent mathematical function from the first frequency-dependent mathematical function, wherein the second mathematical function is formed from a relationship of in each case a real part and an imaginary part of complex function values of the first frequency-dependent mathematical function, the evaluation device is configured to form at least one function value of the second frequency-dependent mathematical function and to determine it as location information about a location of a point of symmetry of the location-dependent mathematical function.

In particular, the location information thus determined can also be multiplied by the factor minus one in order to obtain the location of the point of symmetry.

Configurations of the arrangement are evident from the description of configurations of the method.

In practice, i.e., when the method is carried out or during operation of the arrangement, the location-dependent mathematical function and also the first and/or the second frequency-dependent mathematical function are generally not calculated as abstract mathematical expressions, rather the function values of the location values and frequency values, respectively, are determined concretely. The mathematical functions are therefore defined by their concrete values. A continuous mathematical function in the frequency domain is therefore also defined in practice by discrete function values, in particular. All these values are typically obtained by the processing of corresponding digital data. The data can be stored (temporarily) in at least one data memory in each case for further processing also while the method is being carried out or during the operation of the arrangement.

The first frequency-dependent mathematical function is obtained with the transformation of the location-dependent mathematical function into the frequency domain. For example, the transformation is carried out by at least one data processor (for example by a central processing unit (CPU) and/or by a dedicated data processor, such as a digital signal processor (DSP) or an application-specific integrated circuit (ASIC), for example), or, to put it more generally, by the evaluation device, for the concretely present values and function values of the location-dependent mathematical function.

The second mathematical function is then formed from the first frequency-dependent mathematical function for example by the same data processor or the same data processors. As mentioned, the second mathematical function is formed from a relationship of in each case a real part and an imaginary part of complex function values of the first frequency-dependent mathematical function. In particular, the relationship can be expressed by the phase of the complex function values. However, the relationship and in particular the phase can be expressed mathematically in a different way. In a concrete configuration, the second mathematical function can have the information about the first derivative of the phase of the complex function values of the first frequency-dependent mathematical function, said function values being defined in each case by the real part and the imaginary part, and can correspond in particular directly to the mathematical expression of the first derivative of the phase, in particular to the negative expression. However, the second mathematical function need not explicitly have the function values of the first derivative of the phase, particularly if at least one higher derivative of the phase such as, for example, the second derivative and/or the third derivative has been/is also likewise taken into account in the second mathematical function.

However, many other relationships between the real part and the imaginary part of the complex function values of the first frequency-dependent mathematical function are also suitable for forming the second frequency-dependent mathematical function. Complex numbers and thus also the complex function values can generally be regarded and optionally also represented in each case as a pair of coordinates in a two-dimensional plane or in a two-dimensional coordinate system. In particular, the coordinate axes of the two-dimensional coordinate system can be chosen such that they are linearly independent. In this case, the first coordinate corresponds to the real part, and the second coordinate corresponds to the imaginary part. In this case, the frequency dependence of the second frequency-dependent mathematical function can be regarded as a third variable in addition to the first coordinate and the second coordinate.

An angle defined in the two-dimensional coordinate system has already been mentioned as a description of the relationship between the real part and the imaginary part (or between the first coordinate and the second coordinate). By way of example, the angle has been/is defined as the angle between the positive range of the first coordinate axis and the connecting line from the origin of the coordinate system and to the point given by the coordinates. However, the angle can also be defined differently, e.g., relative to the negative range of the first coordinate axis, relative to the positive or the negative range of the second coordinate axis or to any other straight line running through the origin of the coordinate system.

Furthermore, e.g., trigonometric functions are suitable for expressing the relationship between the real part and the imaginary part. By way of example, the cosine function, the sine function or some other trigonometric function, such as, e.g., the tangent function, of one of the angles mentioned can describe the relationship.

A further alternative for the mathematical description of the relationship between the real part and the imaginary part is functions defined section by section, such as, e.g., spline functions, which are also called polynomial progression functions. Each section of the function may have been/be defined for a subrange of the entire frequency range over which the first frequency-dependent mathematical function is defined. This is advantageous in particular if it is evident from the intended application in a case that different types of evaluation are expedient for different sections of the entire frequency range.

What relationship and, e.g., what mathematical function in a concrete case are suited, or best suited, to describing the relationship between the real part and the imaginary part of the complex function values of the first frequency-dependent mathematical function are dependent on the concrete case. The disclosure is therefore not restricted to a specific description.

The formation of the second frequency-dependent mathematical function from the relationship between the real part and the imaginary part of the complex function values of the first frequency-dependent mathematical function can also be effected in different ways. The formation of a derivative of the relationship with respect to the frequency and the formation of a plurality of derivatives, which are combined with one another to form the second frequency-dependent mathematical function, with respect to the frequency have already been indicated. In this case and/or over and above this, it is possible, e.g., to form a weighting integral over the first derivative and/or a linear combination of derivatives including the first and/or higher derivatives with respect to the frequency, in order, e.g., to compensate for frequency-dependent disturbances by averaging. This may be of considerable relevance in practice. However, there are also other possibilities for forming the second frequency-dependent mathematical function from the relationship between the real part and the imaginary part. In particular, in these cases, too, it is possible to determine and/or define a change in the relationship between the real part and the imaginary part of the complex function values of the first frequency-dependent mathematical function with the frequency, in order to form the second frequency-dependent mathematical function.

As already described for a concrete case above, the location information can still be processed further in order to obtain the location of the capture structure and thus of the object. In particular, the location-dependent mathematical function can be transformed into the frequency domain just for a subregion of the local region captured overall, wherein this subregion corresponds to the capture structure and thus to the point-symmetrical local profile of the optical property. In this case, information about the location of the subregion in the captured local region can also be used in the further processing of the location information.

Alternatively or additionally, in accordance with one typical configuration, it is possible to form the function value of the second frequency-dependent mathematical function at the places of a plurality of frequency values (in particular over a frequency value range) and to obtain the location information in each case. The location information obtained for the different places or the frequency value range can then be used when determining the location of the capture structure, for example by forming an average value. Such a procedure takes account of the problem that the profile of the optical property is not exactly point-symmetrical in practice. To put it another way, the profile can be decomposed into an exactly point-symmetrical portion and an asymmetrical portion. A point-symmetrical location-dependent mathematical function that best corresponds to the not exactly point-symmetrical location-dependent profile could be defined for each frequency value for which the function value is formed. Such mathematical functions differ slightly for the different frequency values. By averaging the function values, for example, it is possible to obtain an expedient measure for the location of the point of symmetry.

In accordance with one concrete configuration, the location-dependent mathematical function can be a function of discrete values of the location, wherein the location-dependent mathematical function is transformed into the frequency domain with a discrete Fourier transformation. In general, the function of discrete values of the location will not itself be point-symmetrical. However, the function of discrete values corresponds to the continuous point-symmetrical profile of the optical property. Particularly for a corresponding function which is transformed into the frequency domain and which is defined for a continuous value range, the condition for determining the location of the point of symmetry from the first derivative of the frequency-dependent continuous function is therefore met.

In particular, the function values of the second frequency-dependent mathematical function can be weighted differently depending on the frequency value. It is typical here for function values for low frequency values to be weighted more highly than function values for higher frequency values. This means that the function values are given lower weighting for a higher frequency value than for a lower frequency value. However, it is possible, for example, for the assigned function values to be weighted equally within a range of the frequency values.

To put it more generally, it is therefore possible to form function values of the second frequency-dependent mathematical function with respect to the frequency for a plurality of frequency values, wherein a weighted value obtained by weighting of the function values is determined as a measure of the location of the point of symmetry. In this case, it is possible, for example, firstly to determine the function values explicitly and then to perform the weighting. Alternatively, it is possible, for example, in each case also to perform the weighting of one of the function values in each case directly after said function value has been calculated. In particular, the evaluation device of the arrangement can be configured to perform the weighting.

For example, all function values which are assigned to a frequency value which is larger than a limit frequency value or which is larger than or equal to a limit frequency value can be set to the value zero. Alternatively or additionally, all of these values are not taken into account when determining the location of the point of symmetry.

The larger weighting of the function values for lower frequencies takes account of the circumstance that undesired influences and/or asymmetries often completely or predominantly affect the range of higher frequency values. Moreover, it may be the case that the sampling theorem (capturing the capture structure with a local resolution that is equal to or finer than the reciprocal of double the frequency) is not complied with starting from a certain frequency value. Therefore, the limit frequency value is typically chosen such that the sampling theorem is complied with for all smaller frequency values. The undesired influences include, e.g., an optical distortion during generation of the capture information, a spectral dependence of the electromagnetic radiation emitted by the capture structure on the location, an inhomogeneous illumination of the capture structure in the wavelength range of the electromagnetic radiation used for optically capturing the capture structure, the relative movement of capture structure and capturing device that takes place, under certain circumstances, during the capturing of the capture information, alterations and/or inhomogeneities of the space between the capture structure and the capturing device (such as, e.g., movement of the air and/or soundwaves in the air in said space) and/or the process of processing the capture information for the purpose of determining the position of the movable object. In particular, the latter includes, in so far as applicable, reading out and processing the digital capture information generated by one or more cameras as capturing device on the basis of the capturing of the capture structure and optionally further capture structures.

If the capturing device captures the capture structure together with its local surroundings, then the capture information obtained corresponds both to the capture structure and to the surroundings. This is advantageous in the case of movement tracking, in particular, since the capturing device can capture the same spatial region over a period of time and then captures the capture structure in each case at different movement positions. In the case of a digital camera, the image of the capture structure can therefore be located, in principle, in an arbitrary local region of the overall image of the captured region that is generated by the digital camera.

It is typical, therefore, to process the location-dependent capture information obtained from capturing the captured region before the transformation of the location-dependent mathematical function and to determine and select that local region which corresponds to the image of the capture structure. The location-dependent mathematical function is formed such that it has function values not equal to zero exclusively within the local region determined. Typically, the mathematical function is restricted to the local region determined, i.e., its location variable is restricted to this one-dimensional or two-dimensional value range. Alternatively, all function values outside the local region determined can be set to the value zero. The location-dependent mathematical function thus obtained is then transformed into the frequency domain.

Furthermore, the location of the local region determined and selected can be determined in order to be taken into account when determining a position of the capture structure in the captured region, particularly if the value range of the location variable of the mathematical function is restricted to the local region determined and selected.

The point-symmetrical profile of the optical property and the possibility of evaluating this profile in relation to one direction or in relation to two directions, which are in particular linearly independent of one another, are discussed in more specific detail elsewhere in this description. In particular, the location information can therefore be determined in relation to one or two linearly independent coordinate axes in the space domain. If the point-symmetrical profile of the optical property is intended to be determined only in relation to one local dimension, i.e., in relation to a location of symmetry, it is sufficient to obtain the first frequency-dependent mathematical function as a one-dimensional function of the frequency and to form only one second frequency-dependent mathematical function. When determining two-dimensional location information about the point of symmetry (defined in two local directions, for example linearly independent directions), the following is typical, however:

In particular, the first frequency-dependent mathematical function, in the case of a two-dimensional location-dependent mathematical function, can be formed as a two-dimensional frequency-dependent mathematical function, wherein from the first frequency-dependent mathematical function two second frequency-dependent mathematical functions are formed, for each of which at least one function value is determined as location information about the location of the point of symmetry, and wherein the two second frequency-dependent mathematical functions respectively correspond to a location coordinate axis of the two-dimensional location-dependent mathematical function and the function values therefore have in each case the location information regarding the corresponding location coordinate axis. The evaluation device can be configured accordingly. Each of the two second frequency-dependent mathematical functions can therefore correspond in particular to the first partial derivative of the phase of the first frequency-dependent mathematical function in relation to one of two frequency components. The function values of the first frequency-dependent mathematical function are dependent on a two-dimensional frequency defined by the two frequency components. Each of the frequency components corresponds in particular respectively to one of the coordinate axes in the space domain.

The disclosure is not restricted to the one-dimensional or two-dimensional local profile of the optical property. In principle, a capture structure or an arrangement composed of a plurality of capture structures can also be captured in such a way that the capture information corresponds to a point-symmetrical three-dimensional profile of the optical property. Therefore, a three-dimensional location-dependent mathematical function corresponding to the profile can be transformed into a frequency domain, as is described analogously for the one-dimensional case and the two-dimensional case in this description. The location information can also be determined for the three-dimensional case analogously to the manner described. In particular, the frequency therefore has three frequency components and three second frequency-dependent mathematical functions can be formed from the three-dimensional first frequency-dependent mathematical function, wherein for the three second frequency-dependent mathematical functions in each case at least one function value is determined as location information about the location of the point of symmetry. Each of the second frequency-dependent mathematical functions can therefore correspond in particular to the first partial derivative of the phase of the first frequency-dependent mathematical function. As also for the one-dimensional and two-dimensional cases, higher partial derivatives of the phase or some other relationship of the real part and the imaginary part of the complex function values of the first frequency-dependent mathematical function can also be taken into account by the second frequency-dependent mathematical functions. The function values of the first frequency-dependent mathematical function are therefore dependent on a three-dimensional frequency defined by the three frequency components. Each of the frequency components corresponds in particular respectively to one of the coordinate axes of a three-dimensional Cartesian coordinate system in the space domain.

In particular, the evaluation device has an output for outputting the position of an, in particular movable, object and/or an orientation of the object determined using the position. The output can be connected in particular to an output device for outputting the information to at least one user and/or to a control device for open-loop and/or closed-loop control of the movement of the movable object (in particular movable machine part). Accordingly, the method can be configured such that the position and/or orientation are/is output to the control device and used by the latter for open-loop and/or closed-loop control of the movement of the movable object. Alternatively or additionally, it is possible, in particular from repeatedly determining the position and/or orientation, to determine the speed and/or acceleration of the movable object and to output this information to the control device and/or to the output device.

As described, the capturing device is arranged at the object or at a reference object. If the capturing device has a plurality of capturing devices and a plurality of capture structures are present, this also concomitantly includes the case that at least one first capturing device of the capturing device is connected to the reference object and at least one second capturing device is connected to the object. The at least one first capturing device then captures at least one capture structure arranged at the object and the at least one second capturing device then captures at least one capture structure arranged at the reference object.

The capture structure can be in particular part of an arrangement of capture structures, part of a marker and/or part of a marker arrangement. Besides the capture structure or the plurality of capture structures, a marker also includes further material that is not part of a capture structure. For example, at least one capture structure can be applied on and/or introduced in a, typically planar, carrier material of a marker and the marker can be/have been secured to the movable object or the reference object.

The term structure is used since the structure extends over a local region that is to be captured in a spatially resolved manner in order to obtain the capture information required for position determination and/or for determining the resolution. In this case, the capture structure, i.e., the structure to be captured, can be configured in one-dimensional, two-dimensional or three-dimensional fashion, as mentioned. For capturing the capture information, the capture structure is captured in any case in an at least one-dimensionally locally resolved manner. The capture structure has a profile of an optical property that varies along a surface of the capture structure. With the optical capturing with a local resolution, the varying profile of the optical property at least along a surface direction of the capture structure can thus be captured and is actually captured when the method is carried out.

Capture structures with their varying profile of the optical property can be produced with inkjet printing, for example. In particular, a continuously changing profile of greyscale levels or greyscale values and thus of the brightness of the surface can be produced with inkjet printing. Inkjet printing has the advantage that it can be produced with very fine resolution and therefore acts like a continuously varying profile despite the fact that digital printing is involved. As an alternative to inkjet printing, some other digital printing method, e.g., laser printing, can be used not just during the production of a greyscale value profile. A non-digital printing method such as screen printing can also be employed for production. Other types of capture structures and the production thereof have already been discussed above.

Therefore, if inkjet printing and/or a greyscale value profile or bright-dark profile are/is mentioned in this description as an example of the concrete configuration of the capture structure, the other production methods and realizations for at least temporary, non-permanent, or permanent production of the capture structure, as mentioned above, are alternatively appropriate in each case. In particular, the capture structure can be configured in a colored fashion. Information about different optical properties can thus be contained in the same surface region of the capture structure and be evaluated. Alternatively or additionally, in contrast to the description above, rather than the optical property varying in each case at a concrete wavelength or in a concrete wavelength range in the manner according to the disclosure (for example the color intensity can vary) and being evaluated, the profile of the optical property along the surface direction can be a point-symmetrical spectral profile, i.e., the wavelength varies with the location.

The entire surface of the capture structure can extend along a plane, in particular. However, the term surface direction can be used not only in this case, but also for example if the surface extends in a curved fashion. In this case, the surface direction is also curved. A surface extending along a plane is typical because the curvature may result in an, in particular non-symmetrical, distortion during the capturing of the capture structure and the frequency spectrum is therefore altered.

BRIEF DESCRIPTION OF THE DRAWINGS

The disclosure will now be described with reference to the drawings wherein.

DESCRIPTION OF EXEMPLARY EMBODIMENTS

Figure 1:
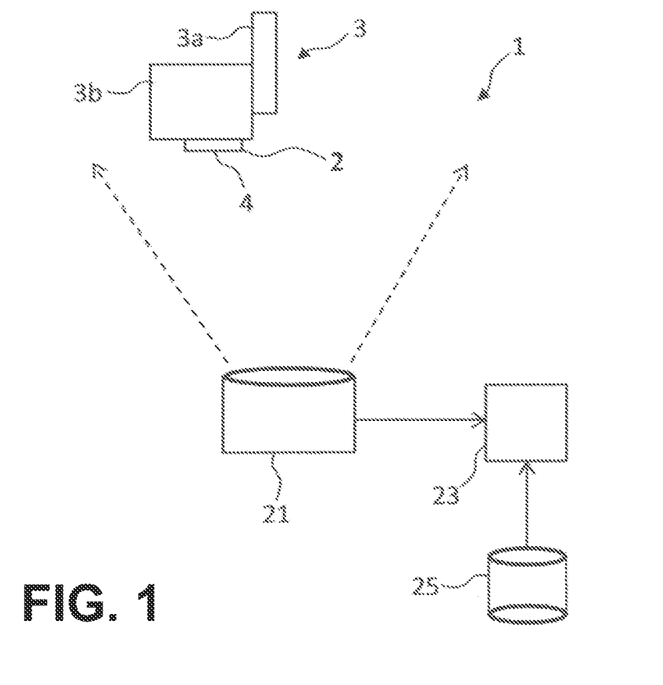
FIG. 1 schematically shows an arrangement for determining a position of an object.

FIG. 1 shows an arrangement 1 with an object 3, which is an arrangement of components 3a, 3b in the exemplary embodiment, wherein a marker 2 is arranged on the component 3b. A capture structure 4 is arranged on the surface of the marker 2 that faces downward. The capture structure 4 can be part of an arrangement of capture structures which are not illustrated in FIG. 2 and the capturing and corresponding position determination of which make it possible to determine overall the orientation and/or the position of the object 3 in relation to more than one degree of freedom of movement. Alternatively or additionally, a second capture structure can be arranged parallel to the capture structure 4 in order to obtain redundant position information by determining the position of the plurality of capture structures.

Besides the marker 2, the arrangement 1 illustrated in FIG. 1 has a suitably arranged capturing unit 21 configured for capturing the capture structure 4 of the marker 2, which capturing unit can be, e.g., a digital camera having a one-dimensional or two-dimensional sensor matrix.

During its operation, the capturing device 21 captures capture information of all objects in its capturing region. Also included therein in any case for a plurality of relative positions of marker 2 and capturing unit 21 is the capture structure 4 at the surface of the marker 2 that faces the capturing unit 21. In particular, the capturing unit 21 generates a one-dimensional or two-dimensional image of the capture structure 4 in its surroundings. Depending on the relative position and relative orientation of marker 2 and capturing unit 21, the images of the capture structure 4 are located at different positions in the image recorded by the capturing unit 21. It is thus possible, in principle, from the position of the image of the capture structure 4 in the recorded image, to determine the relative position of marker 2 and capturing unit 21 and thus of the object 3 connected thereto. According to an aspect of the disclosure, however, the position of the image or images of the capture structure(s) in the recorded image is not determined or not determined only with traditional image processing, rather, e.g., a Fourier transformation is performed and at least one value corresponding to the first derivative (and optionally at least one higher derivative) of the phase with respect to the frequency is calculated as a measure of the position.

The capturing unit 21 and optionally at least one further capturing unit, not illustrated in FIG. 1, is/are connected to an evaluation device 23 for the further processing of the capture information and for determining the position. Furthermore, FIG. 1 shows a data memory 25, from which the evaluation device 23 can obtain data, e.g., information containing prior knowledge, in particular prior knowledge about the arrangement of the capture structure or the plurality of capture structures at the object 3. In particular, it also contains prior knowledge about the profile of the optical property along in each case at least one surface direction of the respective capture structure. This makes it possible, for example, in an image generated by the respective capturing unit, to determine that partial image which corresponds to the capture structure.

Figure 2:
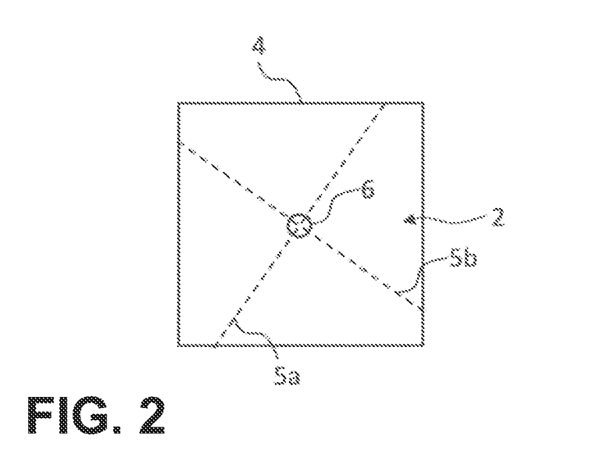
FIG. 2 shows a plan view of a capture structure consisting of a single point-like light source arranged at a carrier.

The marker 4 illustrated in FIG. 2 can be, e.g., the marker 4 illustrated in FIG. 1. The capture structure 2 is realized, e.g., by an approximately point-like light source 6, which can be a single light emitting diode, for example. The choice of the type of light emitting diodes is typically oriented toward the captured radiation flux density distribution that emanates from the light emitting diode being as far as possible exactly point-symmetrical. The light emitting diode 6 is arranged at a carrier of the marker 4, said carrier not being illustrated in FIG. 2. An energy supply for supplying the light source 6 or the light emitting diode is furthermore provided.

Two dashed lines 5a and 5b in FIG. 2 indicate that the profile of the optical property of the capture structure 2 in one surface direction or two surface directions extending perpendicularly to one another can be captured and evaluated. By way of example, the two dashed lines 5a and 5b run in the direction of the rows and columns of a sensor matrix of a digital camera that can realize the capturing device 21 illustrated in FIG. 1. By way of example, a sensor matrix row therefore captures the capture structure 2 along the line 5a. It is typical here for the local resolution during capturing to be fine enough that a plurality of the sensor elements receive electromagnetic radiation emanating from the point-like light source 6. Therefore, the radiation source 6 is not in the form of a point in the mathematical sense, but rather emits electromagnetic radiation over a local region that is very small in relation to the object and the surroundings of the marker. A possible result of the capturing of a light source that is in the form of a point in this sense, e.g., along the line 5a will also be discussed with reference to FIG. 4.

Figure 3:
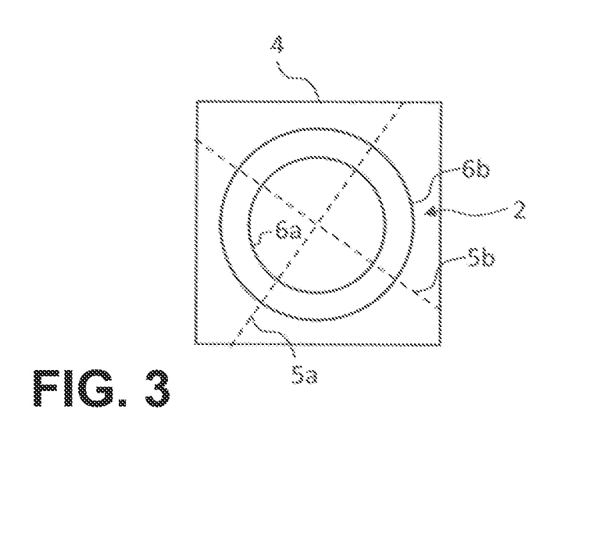
FIG. 3 shows a plan view of a capture structure consisting of two concentric circles formed at the surface of a carrier.

An alternative configuration of the marker 4 illustrated in FIG. 1 with a capture structure 2 arranged at the surface of the marker 4 is illustrated in FIG. 3. Instead of a point-like light source, the capture structure 2 has two concentric circles 6a and 6b. Instead of two concentric circles, the capture structure can also have just one circle. By way of example, a capture structure 2 of this type can be realized by inkjet printing. The circle or circles is/are printed for example by applying colored or black ink onto a planar surface of the marker 4.

Figure 4:
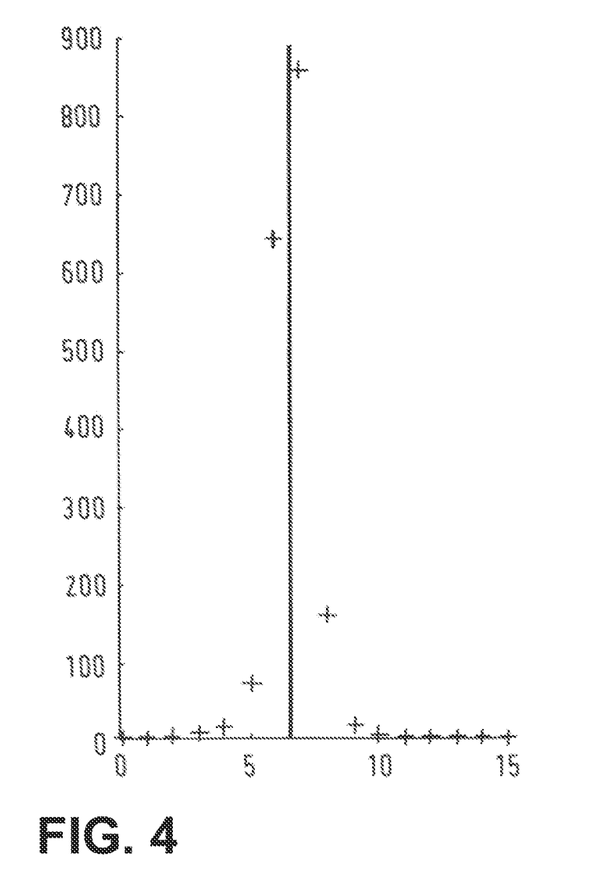
FIG. 4 shows a diagram with values from capturing the capture structure illustrated in FIG. 2, which are values of a location-dependent point-symmetrical mathematical function.

The diagram illustrated in FIG. 4 shows sixteen values—indicated from 0 to 15—of pixels along an image line or image column of an image recorded with a capture structure. By way of example, these values may be pixel values representing the profile of the optical property of the capture structure 2 in FIG. 2. Therefore, the surface of the corresponding marker is, e.g., black in the spectral range of the capturing, such that only electromagnetic radiation emanating from the point-like light source 6 results in pixel values larger than zero. Fourteen of the pixel values represented by crosses in FIG. 4 are therefore not equal to zero. The other two pixel values are equal to zero. Since the sixteen pixel values represented in FIG. 4 are the values of a local profile, they represent in relation to one surface direction the radiation flux density profile of the electromagnetic radiation emitted by the point-like radiation source 6. The profile rises firstly with a small gradient starting approximately from pixel No. 2, the gradient increasing linearly or exponentially. Pixel No. 7 has the highest value. Pixel No. 6 has the second highest value. Since a point-symmetrical profile can be assumed, the maximum of the profile lies between the center point of pixel No. 6 and the center point of pixel No. 7. The position and height of the maximum at the point of symmetry are represented by a bar running in the vertical direction in FIG. 4.

The method according to an aspect of the disclosure of transforming the location-dependent mathematical function into the frequency domain and calculating a value corresponding to the first derivative of the phase with respect to the frequency makes it possible to determine the point of symmetry and thus the position of the capture structure with subpixel accuracy. In the example shown in FIG. 4, the location-dependent mathematical function has the sixteen function values represented and is thus a function of discrete values. As mentioned, powerful algorithms for the Fourier transformation of such discrete location-dependent functions are available, which enable the position of the capture structure to be calculated rapidly. A prerequisite, however, as likewise already described, is the point symmetry of the mathematical function in the space domain. In this case, the accuracy of the method is also dependent on the magnitude of the asymmetrical portions of the point-symmetrical function in practice, in particular the asymmetrical portions in relation to low frequencies.

Figure 5:
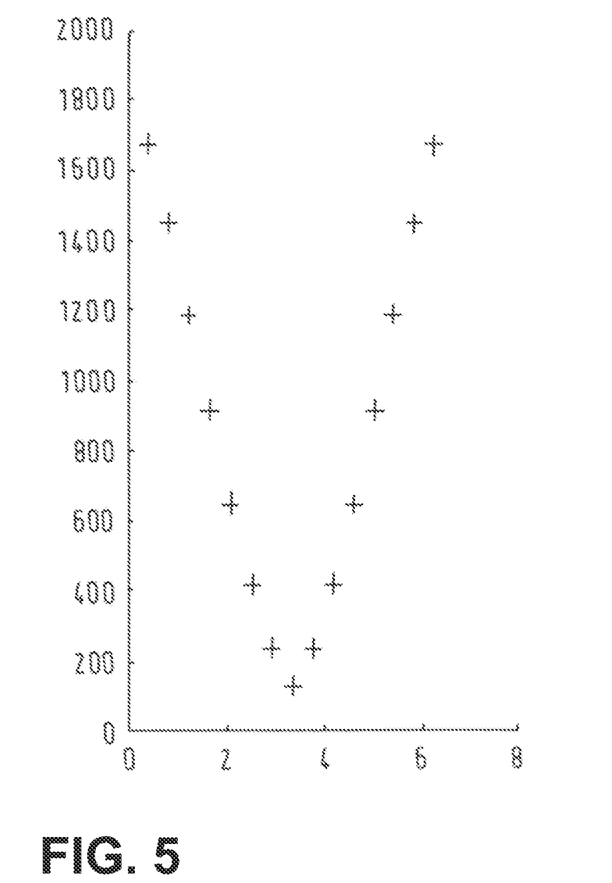
FIG. 5 shows a diagram with absolute values of the frequency-dependent mathematical function obtained by discrete Fourier transformation of the location-dependent mathematical function in accordance with FIG. 4.

FIG. 5 shows the frequency spectrum, i.e., the absolute value of the complex function values of the frequency-dependent mathematical function that was obtained by Fourier transformation (e.g., carried out as FFT) of the location-dependent mathematical function in accordance with the illustration in FIG. 4. Like the units along the vertical axis in FIG. 4, the units along the vertical axis in FIG. 5 are also of no importance for the explanation of the examples described here.

Since the function values in FIG. 5 are the absolute value of the complex function values, the information about the position of the point of symmetry of the location-dependent mathematical function between the center point of pixel No. 6 and the center point of pixel No. 7 in FIG. 4 is not discernible from the representation of the absolute values. In the case of an exactly point-symmetrical function in the space domain and given compliance with the sampling theorem, it should be expected, however, that the phase of the complex function values of the function transformed into the frequency domain is a straight line having a negative gradient, the first derivative of which with respect to the frequency has a numerical value of between six and seven on the scale defined by the index values of the pixels.

Figure 6:
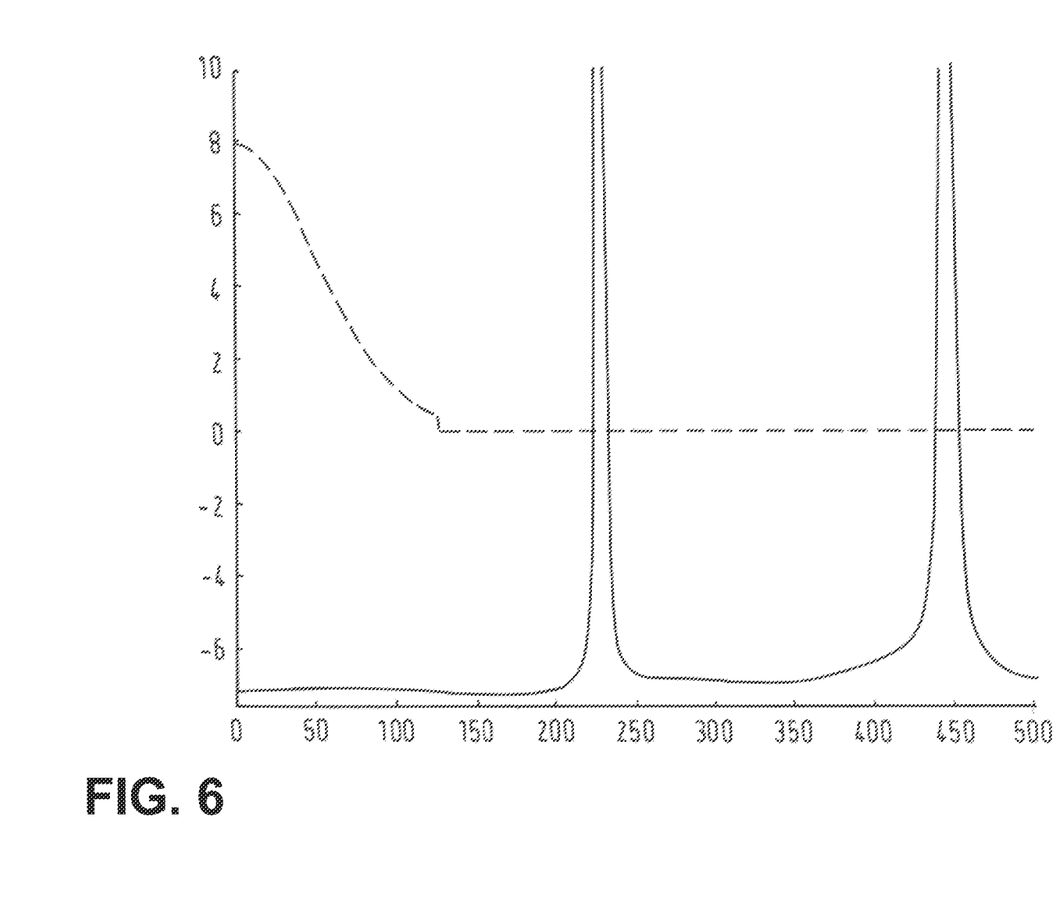
FIG. 6 shows a diagram with values of the first derivative of a frequency-dependent mathematical function obtained by Fourier transformation with respect to the angular frequency and with a weighting function that weights the first derivative according to a Gaussian normal distribution up to a limit frequency value and, starting from the limit frequency value, weights all values of the derivative with the weight zero.

From the absolute values of the function transformed into the frequency domain that are plotted in FIG. 5, it is evident that, on account of the small number of only sixteen pixel values and the corresponding local resolution of the sampling, only eight frequencies in the frequency domain have meaningful values. In the profile of the frequency values in FIG. 5 proceeding from the frequency value zero, FIG. 5 reveals a continuous decrease in the absolute value. However, unlike in the case of sampling that satisfies the sampling theorem for all frequencies, a decrease in the absolute values to zero is not reached. Rather, the absolute values rise again toward higher frequencies approximately in a mirror-inverted fashion with respect to the decrease at low frequencies, specifically before the absolute value zero was reached. In practice, it is therefore typical for the function values of the second frequency-dependent mathematical function formed from the function transformed into the frequency domain to be weighted such that frequencies for which the sampling theorem is not complied with are disregarded or are given at most very low weighting. This will be discussed again when FIG. 6 is described.

As is substantiated below, it is possible to determine the position for a symmetrical profile of the optical property in a simple manner. It is assumed here that the case of a mathematical function describing the profile of the optical property along a location axis involves a function having real function values. This corresponds to the real values which are obtained from capturing the local profile of the optical property. For real functions which are symmetrical with respect to the zero point of the location axis, it can be shown that the Fourier transform $X(\omega)$ is likewise a real function which is symmetrical with respect to the zero point of the frequency $\omega$:

$$X(\omega)=X(-\omega)=\overline{X(\omega)} \quad \text{(equation 1)}$$

In this case, the bar denotes complex conjugation, i.e., the sign of the imaginary part is reversed. For each frequency $\omega$, therefore, the absolute value of the Fourier transform is equal to the value of the Fourier transform and the phase is $\arg(X(\omega))=0$. However, if the optical property as a function of the location is not symmetrical with respect to the zero point, but rather with respect to some other location a along the surface direction considered, then the following holds true:

$$F\{x(t-a)\}=X(\omega)\cdot e^{-j\omega a}=:\tilde{X}(\omega), \quad \text{(equation 2)}$$

where F is the operator of the Fourier transformation, x is the function in the space domain, t is the location variable in the space domain, i.e., along the surface direction considered, e is the Euler number, and j is the imaginary unit, where $j^2=-1$. In accordance with equation 2, the displacement of the point of symmetry or center of symmetry along the location axis has the effect that the Fourier transform of the location function is a complex function. It results from the Fourier transform of the location function that is symmetrical with respect to the zero point by multiplication by $e^{-j\omega a}$. It follows directly from this that the phase of the complex Fourier transform is:

$$\arg(\tilde{X}(\omega))=-\omega a \quad \text{(equation 3)}$$

It follows in turn from this that $$\frac{\partial}{\partial \omega}\arg(\tilde{X}(\omega))=-a \quad \text{(equation 4)}$$

i.e., the first derivative of the phase with respect to the frequency is equal to the negative of the displacement of the point of symmetry along the location axis from the zero point.

Since in practice, as already described on the basis of the exemplary embodiment in FIG. 4, typically discrete values are obtained as a result of capturing the capture structure, a signal in the form $$x_A(t) = x(t) = x(t)\cdot \sum_{n=-\infty}^{\infty} \delta(t-n\Delta T_A) \quad \text{(equation 5)}$$

is present. In this case, $X_A$ denotes the location-dependent mathematical function, $\delta$ denotes the delta distribution, n denotes the index of the places at which the discrete function values of the location-dependent mathematical function are present, and $\Delta T_A$ denotes the step size of the places. If the discrete location-dependent mathematical function is then transformed into the frequency domain in which the DTFT is implemented, then the following is obtained:

$$\mathcal{F}\{x_A(t)\} = DTFT\{x[n]\}(\omega) = X_A(\omega) = \sum_{n=-\infty}^{\infty} x[n]e^{-j\omega n \Delta T_A} \quad \text{(equation 6)}$$

where $$x[n]=x(n\Delta T_A) \quad \text{(equation 7)}$$

By way of example, ATA can in practice be set to the step size one. When determining the position, it is then merely still necessary again to take account of the conversion of the step size one in accordance with the respective location scale. On account of equation 6 being analogous to equation 2, it is then evident that for the case of discrete-location functions, too, the negative gradient or negative first derivative of the phase of the function transformed into the frequency domain yields the location of the point of symmetry of the location-dependent mathematical function and thus of the capture structure captured.

An expression is then derived or specified which makes it possible, in practice, to calculate the position a of the point of symmetry in a simple manner, in particular with a data processor:

$$a(\omega) = \text{Im}\left[\frac{jDTFT\{n\Delta T_A x[n]\}(\omega)}{DTFT\{x[n]\}(\omega)}\right] \quad \text{(equation 8)}$$

In this case, mathematical relationships with regard to the imaginary part Im of the frequency-dependent mathematical function and rules for the calculation of the first derivative of the logarithm of the frequency-dependent mathematical function x(n) transformed into the frequency domain with a DTFT have been taken into account.

As already mentioned, the location-dependent mathematical function is not exactly point-symmetrical in practice. For different frequencies, the optimum point-symmetrical approximation functions would be different functions with mutually deviating positions of the points of symmetry. In particular, noise components may be included. Practical investigations by the inventor have revealed that noise components occur predominantly at higher frequencies. Corresponding disturbing influences have already been described. Moreover, it has already been mentioned that the sampling theorem is possibly no longer satisfied for higher frequencies. Therefore, a higher weighing of the results for lower frequencies in comparison with higher frequencies is expedient and is typical.

A result a weighted in this way for the determination of the position a of the point of symmetry can be obtained as follows:

$$\hat{a} := \int_0^{\frac{\pi}{\Delta T_A}} w(\omega) \cdot \frac{\partial}{\partial \omega} \arg(X_A(\omega)) d\omega \quad \text{(equation 9)}$$

$$= \int_0^{\frac{\pi}{\Delta T_A}} w(\omega) \cdot a(\omega) d\omega$$

where the expression on the right-hand side of equation 8 can be used for a in the expression on the right-hand side of equation 9. The function w(ω) is the weighting function whose integral over the limits of the integral contained in equation 9 typically yields the value 1. For example, a weighting function can be a Gaussian normal distribution function whose function values are zero starting from a limit frequency value.

For the locally two-dimensional case, an equation 10 corresponding to equation 8 above can be specified as follows:

$$a = \text{Im}\left[\frac{jDTFT\{n\Delta T_A x[n, m]\}(\omega, v)}{DTFT\{x[n, m]\}(\omega, v)}\right] \quad \text{(equation 10)}$$

In this case, m denotes the index of the places at which the discrete function values of the location-dependent mathematical function are present in relation to a coordinate axis that is linearly independent of the coordinate axis of the index n, and v denotes the second frequency component of the two-dimensional frequency. To put it another way, the space domain for which the two-dimensional location-dependent mathematical function is defined can be defined by two coordinate axes that are linearly independent of one another, i.e., coordinate axes of a Cartesian coordinate system that run perpendicularly to one another. The index n is defined in relation to a first of the coordinate axes, and the index m is defined in relation to the other of the coordinate axes. Each of these location coordinates axes corresponds to one of the frequency components ω, v of the two-dimensional frequency. The expression on the right-hand side of equation 10 can be interpreted as a negative first partial derivative of the two-dimensional phase and thus as a location coordinate of the point of symmetry in relation to the first location coordinate axis. For the second location coordinate of the point of symmetry, i.e., for the coordinate in relation to the other location coordinate axis, an expression analogous to equation 10 can be specified in which the index n before the term ATA in the numerator is merely replaced by the index m. This can be interpreted as the first partial derivative of the two-dimensional phase in relation to the other component of the two-dimensional frequency.

This description has already mentioned a number of times that higher derivatives of the phase (or some other relationship between the real part and the imaginary part of the function values of the first mathematical function) with respect to the frequency can also be taken into account by way of the second mathematical function. The following equation represents one example for the calculation of the weighted result a for the determination of the position a of the point of symmetry analogously to equation 9:

$$\hat{a} := -\int_0^{\frac{\pi}{\Delta T_A}} w(\omega) \cdot \left(\frac{\partial}{\partial \omega} \arg(X_A(\omega)) - \right. \quad \text{(equation 11)}$$

$$\left. \lambda_1 \cdot \frac{\partial}{\partial \omega^2} \arg(X_A(\omega)) + \lambda_2 \cdot \frac{\partial}{\partial \omega^3} \arg(X_A(\omega))\right) d\omega$$

The factors $\lambda_1$ and $\lambda_2$ can be chosen empirically and can be obtained with a calibration, for example. During the calibration, the location information obtained in accordance with equation 11 can be compared with location information determined in some other way and the aforementioned factors can be adapted such that the location information obtained in accordance with equation 11 corresponds to that determined in some other way. In particular, it is possible to proceed in this way a number of times for different instances of capturing the capture structure or the arrangement of capture structures; in particular, capturing can be effected from different capturing positions of the capturing device. In this way, it is possible to obtain for the factors redundant information that is valid for a larger range of application.

The profile of the first derivative of a real mathematical function transformed into the frequency domain is represented by the solid line in FIG. 6. Values of the frequency for example of the angular frequency, are plotted along the horizontal axis. For two frequency values of approximately 220 and 440, a rise and fall in the manner of a delta function is evident in each case. Such profiles of the first derivative are attributable to the effects described above and the contravention of the sampling theorem. The derivative function can be expediently weighted with the weighting function represented by a dashed line, said weighting function decreasing in accordance with a Gaussian standard distribution function up to a limit frequency value at approximately 125 and then having a constant profile at the value zero. It should be noted that the zero point along the vertical axis in FIG. 6 both in relation to the derivative function and in relation to the weighting function is located above the horizontal axis, at the level at which the weighting function has a constant value of zero starting from the limit frequency value.

The equations above were specified for the case of a one-dimensional location-dependent mathematical function in accordance with the one-dimensional capturing of the local profile of the optical property of the capture structure. However, corresponding equations can also be specified for the case of a two-dimensional location-dependent mathematical function corresponding to the capturing of the capture structure along two surface directions running perpendicularly to one another. The frequencies in the frequency domain can be expressed by two components w and v in this case. The position a of the point of symmetry in relation to one of the two directions in the space domain results from the negative first partial derivative of the frequency-dependent function, transformed into the frequency domain, $X_A(\omega, v)$ with respect to w. The position b of the point of symmetry in relation to the other of the two directions in the space domain results from the negative first partial derivative of the frequency-dependent function, transformed into the frequency domain, $X_A(\omega, v)$ with respect to v. The expressions in the further equations specified above can be extended to the locally two-dimensional case in a corresponding manner.

In the text that follows, results of an implementation of the method according to the disclosure are described and compared with a position determination without transformation into the frequency domain with the method of centroid determination.

A marker with a point-like light source, as described with reference to FIG. 2, was captured by a digital camera. The local resolution and the profile of the sampling signal corresponded to those of the example in accordance with FIG. 4. Point-like light sources of this type were captured 72,600 times in total and were evaluated both by implementation of the method according to the disclosure and by the method of centroid determination. The error of the position determination had a standard deviation of 0.005012 pixels in relation to a Gaussian normal distribution in the case of the implementation of the method according to the disclosure, and a standard deviation of 0.012827 pixels in the case of the implementation of the method of centroid determination. Moreover, it could be observed that the errors of the position determination in the case of the implementation of the method according to the disclosure were of the same order of magnitude even when the errors in the case of the implementation of the method of centroid determination were particularly large. In the case, too, of a two-dimensional position determination of the point of symmetry, the better results by comparison with the method of centroid determination could be confirmed, particularly if the sampling theorem was slightly contravened or images of the capture structure were trimmed on one side and the corresponding location-dependent mathematical function was no longer symmetrical.

It is understood that the foregoing description is that of the exemplary embodiments of the disclosure and that various changes and modifications may be made thereto without departing from the spirit and scope of the disclosure as defined in the appended claims.

What is claimed is:

1. A method for determining at least one of a position, a speed, and an acceleration of an object, the method comprising:
    optically capturing at least one capture structure arranged at the object or at a reference object captured from the object and thereby obtaining capture information;
    the at least one capture structure having a point-symmetrical profile of an optical property that varies along a surface of the at least one capture structure;
    transforming a location-dependent mathematical function corresponding to the point-symmetrical profile of the optical property that is captured with the capture information into a frequency domain, such that a first frequency-dependent mathematical function is obtained;
    forming a second frequency-dependent mathematical function from the first frequency-dependent mathematical function, wherein the second frequency-dependent mathematical function is formed from a relationship of in each case a real part and an imaginary part of complex function values of the first frequency-dependent mathematical function;
    forming at least one function value of the second frequency-dependent mathematical function and determining the at least one function value as location information about a location of a point of symmetry of the location-dependent mathematical function;
    determining the at least one of the position, the speed, and the acceleration of the object based on the location information; and
    performing at least one of:
        (1) controlling a movement of a movable part of a machine arrangement, and
        (2) tracking a movement of the object, based on the at least one of the position, the speed, and the acceleration of the object.

2. The method according to claim 1, wherein the object is a component of an arrangement of components.

3. The method according to claim 1, wherein the location-dependent mathematical function is a function of discrete values of the location, and
    wherein the location-dependent mathematical function is transformed into the frequency domain with a discrete Fourier transformation.

4. The method according to claim 1, wherein the at least one function value of the second frequency-dependent mathematical function is formed for a plurality of frequency values, and
    wherein a weighted value obtained by weighting the function values is determined as a measure of the location of the point of symmetry.

5. The method according to claim 4, further comprising:
    weighting function values of the second frequency-dependent mathematical function higher for low frequency values than for higher frequency values.

6. The method according to claim 5, wherein all function values which are assigned to a frequency value which is larger than a limit frequency value or which is larger than or equal to the limit frequency value:
    are weighted such that a weighted value of zero arises, and/or
    are not taken into account in a determination of the location of the point of symmetry.

7. The method according to claim 1, further comprising:
    forming the first frequency-dependent mathematical function, in the case of a two-dimensional location-dependent mathematical function, as a two-dimensional frequency-dependent mathematical function;
    forming, from the first frequency-dependent mathematical function, two second frequency-dependent mathematical functions, for each of which the at least one function value is determined as the location information about the location of the point of symmetry, and
    wherein the two second frequency-dependent mathematical functions respectively correspond to a location coordinate axis of the two-dimensional location-dependent mathematical function and the function values therefore have in each case the location information regarding the corresponding location coordinate axis.

8. An arrangement for determining a position of an object, the arrangement comprising:
    at least one capture structure arrangeable at the object or at a reference object captured from the object;
    a capturing device configured to optically capture the at least one capture structure and to thereby obtain capture information;
    the at least one capture structure having a point-symmetrical profile of an optical property that varies along a surface of the at least one capture structure;
    an evaluation device, wherein the evaluation device and/or the capturing device are/is configured to generate a location-dependent mathematical function corresponding to the point-symmetrical profile of the optical property that is captured with the capture information; and the evaluation device being configured to:

transform the location-dependent mathematical function into a frequency domain, such that a first frequency-dependent mathematical function is obtained, form a second frequency-dependent mathematical function from the first frequency-dependent mathematical function, wherein the second frequency-dependent mathematical function is formed from a relationship of in each case a real part and an imaginary part of complex function values of the first frequency-dependent mathematical function, form at least one function value of the second frequency-dependent mathematical function and to determine it as location information about a location of a point of symmetry of the location-dependent mathematical function, determine the position of the object based on the location information, and control a movement of a movable part of a machine arrangement based on the position of the object.

9. The arrangement according to claim 8, wherein the object is a component of an arrangement of components.

10. The arrangement according to claim 8, wherein the location-dependent mathematical function is a function of discrete values of the location, and wherein the evaluation device is configured to transform the location-dependent mathematical function into the frequency domain with a discrete Fourier transformation.

11. The arrangement according to claim 8, wherein the evaluation device is configured to form the at least one function value of the second frequency-dependent mathematical function for a plurality of frequency values and to determine a weighted value obtained by weighting the function values as a measure of the location of the point of symmetry.

12. The arrangement according to claim 11, wherein the evaluation device is configured to weight function values of the second frequency-dependent mathematical function higher for low frequency values than for higher frequency values.

13. The arrangement according to claim 12, wherein the evaluation device is configured such that all function values which are assigned to a frequency value which is larger than a limit frequency value or which is larger than or equal to the limit frequency value:

are weighted such that a weighted value of zero arises, and/or are not taken into account in a determination of the location of the point of symmetry.

14. The arrangement according to claim 8, wherein the evaluation device is configured to form the first frequency-dependent mathematical function, in the case of a two-dimensional location-dependent mathematical function, as a two-dimensional frequency-dependent mathematical function and to form, from the first frequency-dependent mathematical function, two second frequency-dependent mathematical functions, for each of which the at least one function value is determined as the location information about the location of the point of symmetry, and wherein the two second frequency-dependent mathematical functions respectively correspond to a location coordinate axis of the two-dimensional location-dependent mathematical function and the function values therefore have in each case the location information regarding the corresponding location coordinate axis.

* * * * *

UNITED STATES PATENT AND TRADEMARK OFFICE
CERTIFICATE OF CORRECTION

PATENT NO. : 11,948,293 B2
APPLICATION NO. : 17/163543
DATED : April 2, 2024
INVENTOR(S) : Wolfgang Hoegele It is certified that error appears in the above-identified patent and that said Letters Patent is hereby corrected as shown below:

On the Title Page

Item (56) U.S. PATENT DOCUMENTS change:

"US-20180018778-A1 1-2018 Haverkamp" to "US-20180018778-A1 1-2018 Haverkamp et al."

"US-9060222-B2 6-2015 Feistel" to "US-9060222-B2 6-2015 Feistel et al."

"US-20140270357-A1 9-2014 Hampiholi" to "US-20140270357-A1 9-2014 Hampiholi et al."

"US-11560292-B2 1-2023 Kosaka" to "US-11560292-B2 1-2023 Kosaka et al."

"US-10957074-B2 3-2021 Deng" to "US-10957074-B2 3-2021 Deng et al."

"US-20170330350-A1 11-2017 Ulichney" to "US-20170330350-A1 11-2017 Ulichney et al."

In the Specification

For SUMMARY:

Column 8, Line 14: Replace "2n" with "2π"

For DESCRIPTION OF EXEMPLARY EMBODIMENTS:

Column 20, Line 5: Replace "$x_A(t) = x(t) = x(t) \cdot \sum_{n=-\infty}^{\infty} \delta(t - n\Delta T_A)$" with Signed and Sealed this
Thirtieth Day of September, 2025

John A. Squires
*Director of the United States Patent and Trademark Office*

CERTIFICATE OF CORRECTION (continued)
U.S. Pat. No. 11,948,293 B2

" $$x_A(t) = x(t) \cdot \sum_{n=-\infty}^{\infty} \delta(t - n\Delta T_A)$$ "

Column 20, Line 18: Replace "ATA" with "$\Delta T_A$"

Column 21, Line 4: Replace "A result a weighted" with "A result â weighted"

Column 21, Lines 7-8: Replace

" $$\hat{a} := \int_0^{\frac{\pi}{\Delta T_A}} w(\omega) \cdot \frac{\partial}{\partial \omega} \arg(X_A(\omega)) \, d\omega = \int_0^{\frac{\pi}{\Delta T_A}} w(\omega) \cdot a(\omega) \, d\omega$$ " with " $$\hat{a} := -\int_0^{\frac{\pi}{\Delta T_A}} w(\omega) \cdot \frac{\partial}{\partial \omega} \arg(X_A(\omega)) \, d\omega = \int_0^{\frac{\pi}{\Delta T_A}} w(\omega) \cdot a(\omega) \, d\omega$$ "

Column 21, Line 44: Replace "ATA" with "$\Delta T_A$"

Column 22, Line 1: Replace "weighted result a for the determination of the position a of the point of symmetry" with "weighted result â for the determination of the position a of the point of symmetry"

Column 22, Line 48: Replace "w" with "ω"

Column 22, Line 53: Replace "w" with "ω"